INVENTOR.
Erwin W. Tschudi

Oct. 27, 1953   E. W. TSCHUDI   2,656,711
SHOCK TESTING MACHINE
Filed Oct. 26, 1951   3 Sheets-Sheet 2
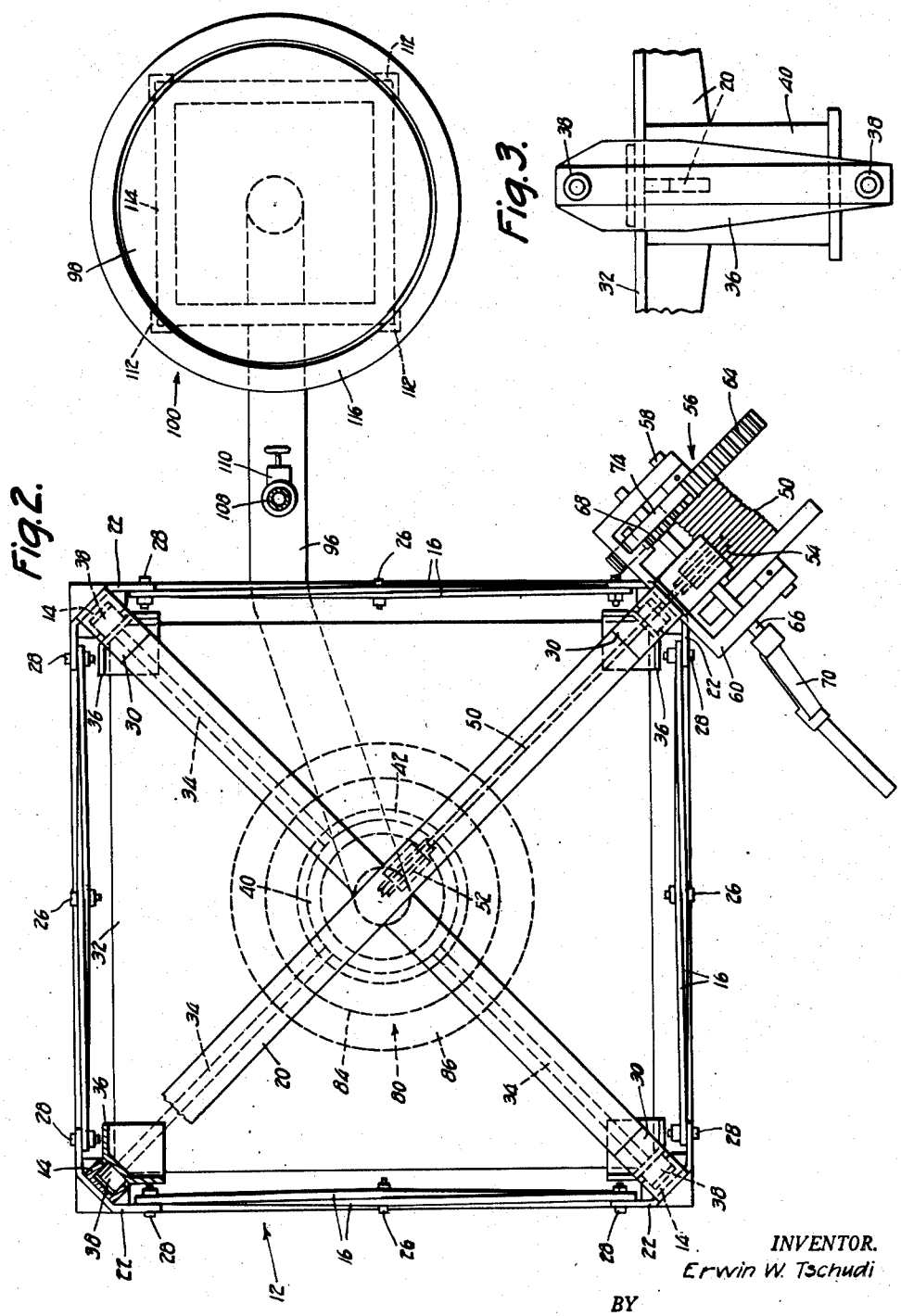
INVENTOR.
Erwin W. Tschudi
BY
ATTORNEYS Oct. 27, 1953 — E. W. TSCHUDI — 2,656,711

SHOCK TESTING MACHINE

Filed Oct. 26, 1951 — 3 Sheets-Sheet 3

INVENTOR.
Erwin W. Tschudi
BY
ATTORNEYS

Patented Oct. 27, 1953

2,656,711

UNITED STATES PATENT OFFICE 2,656,711

SHOCK TESTING MACHINE

Erwin W. Tschudi, Baldwin, N. Y., assignor to Aeroflex Laboratories, Inc., Long Island City, N. Y., a corporation of New York Application October 26, 1951, Serial No. 253,289

9 Claims. (Cl. 73—12)

This invention relates to drop test machines. The function of such a machine is to test more or less delicate equipment by subjecting the equipment under controlled conditions to shocks equivalent to those which it is expected to encounter in normal usage and handling. For this purpose it should be possible to subject the equipment to a definite and predetermined measure of acceleration for a specified length of time.

In the past several attempts have been made to design and build drop test machines. The nearest approach to a satisfactory drop tester is a comparatively massive machine which employs centrifugal action. That machine is capable of subjecting a test sample to a specified acceleration for a given length of time, but only after a relatively slow build up of acceleration. True shock conditions are not duplicated because of the protracted build-up and because the rate of change of acceleration occurring in actual shock is not imitated exactly.

It is an object of the present invention to provide a drop tester which actually drops the sample to be tested, at the bottom of a measured fall subjects it to a predetermined deceleration for a sufficiently long time to simulate actual conditions of shock, and then automatically repeats the cycle several times as the sample bounces up and down, so as to provide a genuine drop test.

It is an important feature that provision is made for adjusting the decelerating force in accordance with the mass to be decelerated, so that the work may be subjected to any predetermined measure of deceleration which may be desired throughout a wide range.

The tester is desirably equipped with means for graphically recording the magnitude of the deceleration, the abruptness with which the deceleration is applied, the duration of the deceleration period, and the duration of the several intervals between such periods. Such a graphical record furnishes visual evidence of the conditions of the test and may be filed as a permanent record.

Other objects and advantages will hereinafter appear.

In the drawing forming part of this specification,

Figure 2 is a plan view of the drop tester of Figure 1;

Figure 3 is a fragmentary detail view of a platform runner or guide employed in the tester;

Figure 1:
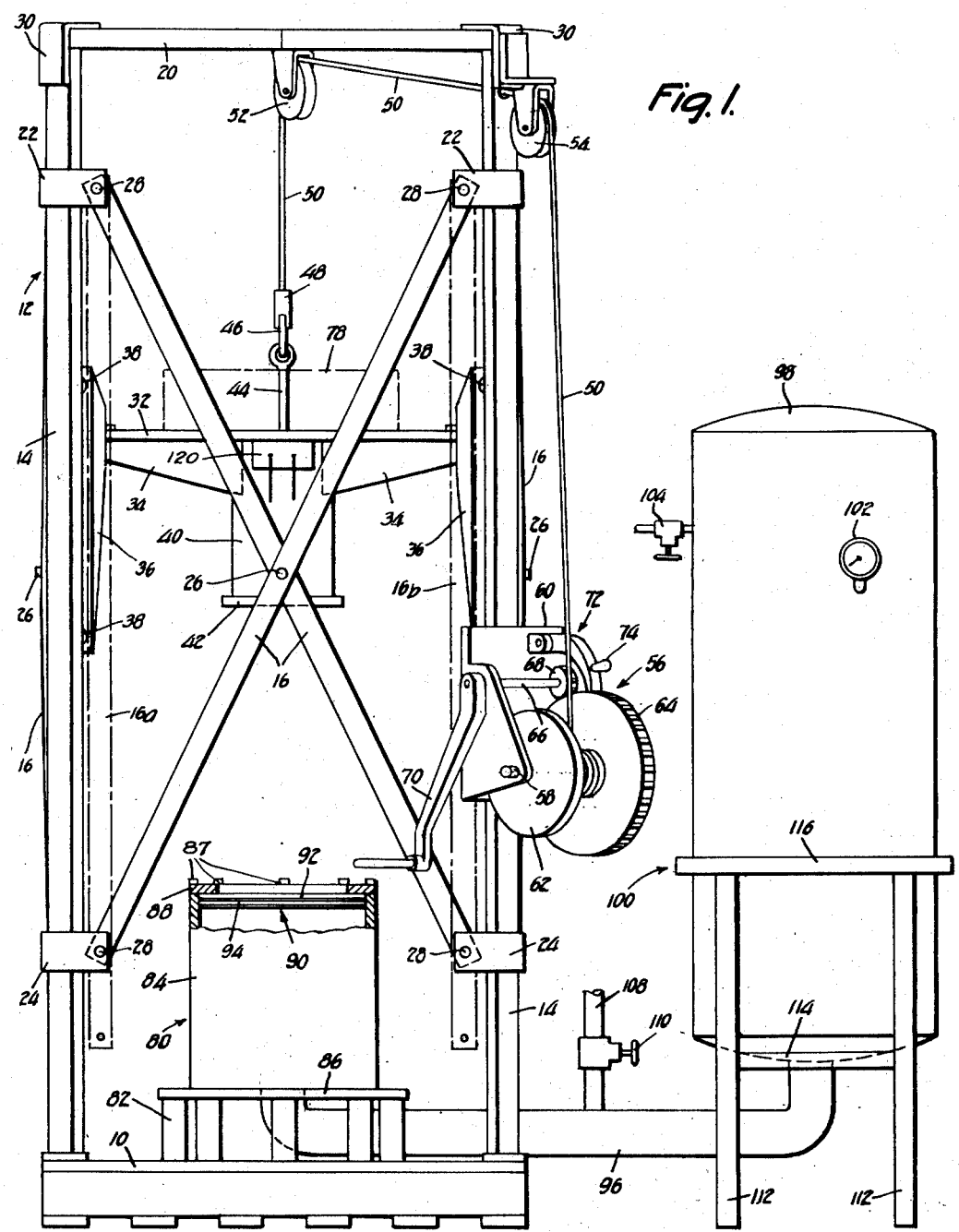
Figure 1 is a view in front elevation of an illustrative drop tester embodying the invention.
Figure 4:
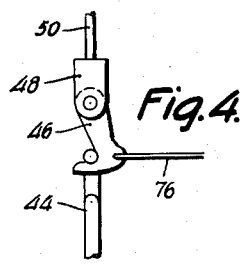
Figure 4 is a fragmentary detail view of a tripping device by which the load is released.
Figure 4A:
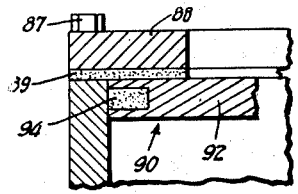
Figure 4a is a fragmentary view in sectional elevation showing on a larger scale than Figure 1 certain details of structure present in Figure 1.

The illustrative machine comprises a solid, rigid base 10 which supports a frame 12. The frame 12 includes four vertical corner posts 14, rigid with the base, which are connected along the sides by inclined tie bars 16. The posts are all rigidly interconnected at their upper ends by a cross 20. Each of the posts 14 is a channel bar whose sides extend inward diagonally of the frame for short distances.

Each of the four posts 14 has affixed to it an upper angle bracket 22 and a lower angle bracket 24. The four brackets 22 are at a common level, and the four brackets 24 are at a common level. The brackets 22 and 24 are alike in construction. Each includes a base or body portion which is secured to the outer face of the associated post 14 and side arms which extend at angles of 135 degrees to the base and at right angles to one another. Each tie bar 16 is connected at its upper end to a side arm of one of the brackets 22 on one post and at its lower end to a side arm of one of the brackets 24 on an adjacent post. The tie bars 16 are arranged in crossing pairs, the bars of a pair being in each instance connected to one another where they cross by a bolt and nut combination 26. In every instance the tie bars are connected to the brackets 22 and 24 through a bolt and nut combination 28. When desired, free access to the structure within the frame may be had by disconnecting a crossed pair of tie bars 16 from one another and disconnecting their lower ends from the brackets 24. The pair thus disconnected will then hang vertically downward from their respective brackets 22 in the positions illustrated in dot and dash lines at 16a and 16b in Figure 1. The cross 20 is connected to the posts 16 through angle brackets 30 at the upper ends of the posts.

The posts serve as guides for a work carrying platform 32 which is adapted to be raised vertically with the work made fast upon it and then dropped. The platform 32 is provided on its lower side with rigid, reinforcing fins 34 which extend diagonally from the several corners inward toward the center. At each corner the platform has rigidly secured to it, as by welding, a rigid, vertically extending, guide-carrying angle plate 36. Each plate 36 extends for a substantial distance above and below the platform and each carries at widely spaced points upper and lower guide rollers 38 which travel in the channel of the associated post 14. The guide rollers cause the platform always to maintain a horizontal attitude, and cause it to drop freely when it has been raised and then released.

The platform is provided at the center of its lower side with a cylindrical extension 40, the extension being secured rigidly to the platform 32 and to the inner ends of the fins 34 in any suitable manner as by welding. The body of the cylindrical extension 40 may be formed by a hollow sleeve, but it also includes a lower end plate 42 of circular form.

Provision is made of mechanism for raising the platform 32 with the supported work piece to a predetermined height and then releasing it to fall freely. For this purpose a lifting member 44 formed with an eye at its upper end is connected to extend vertically upward from the platform. A hook 46 is pivotally carried by a terminal block 48 which is provided at the lower end of a lifting cable 50 and engages the eye of the member 44 during the lifting of the platform 32. The cable is trained upon a central pulley 52 carried by the cross 20 and upon a side pulley 54 carried at the upper end of one of the posts 14.

From the pulley 54 the cable 50 extends downward to a winch 56. The winch comprises a winding shaft 58 which is rotatively supported in a frame carried bracket 60. The shaft 58 has affixed to it, in spaced relation, a cable confining disc 62 and a drive gear 64 which gear also serves as a cable confining disc. A parallel shaft 66, also rotatively supported in the bracket 60, has a comparatively small gear 68, in mesh with the gear 64, affixed to one of its ends, and an operating crank handle 70 affixed to its opposite end.

As the parts are viewed in Figure 1 the platform is raised by turning the crank handle 70 in a counterclockwise direction. This causes the winding shaft to wind up the cable 50 by turning in a clockwise direction. A holding pawl 72 is pivoted on the bracket 60 above the gear 64 and bears by gravity against the upper side of the gear. As the gear 64 is turned the pawl rides over the successive gear teeth and falls into the gear notches one after another, automatically to prevent retrograde movement of the gear and loss of control of the platform and work. The pawl 72 is equipped with a finger piece 74 whereby it may be raised to free the gear 64 for turning in the opposite direction when that is required. Such turning will be required when a test has been completed and it is desired once more to lower the hook 46 into position for engaging the member 44. The terminal block 48 is desirably made heavy enough to counterbalance the length of cable that extends between the pulley 54 and the winch, so that the hook will be lowered in response to a mere turning of the handle 70 in the appropriate direction.

When the platform has been raised to a desired height, a tape 76 which is connected to the hook 46 and which extends laterally to the edge of the platform and thence downward to within reach of the operator is tugged sharply to jerk the hook out of engagement with the lifting member 44. This releases the platform, leaving it free to fall with the work piece 78 which has been firmly affixed to it.

As the platform and the work piece fall they are accelerated by gravity and develop momentum. The downward motion is abruptly decelerated and the platform with its load is caused to rebound by resilient, pneumatic buffer mechanism now to be described.

A pneumatic cylinder 80 is supported from the base 10 in spaced relation to the base by posts 82. The cylinder 80 comprises a sleeve member 84 which is connected to a lower end closure plate 86. As shown, the plate desirably extends outward beyond the sleeve to provide a comparatively broad and stable support for the cylinder. The upper end of the sleeve 84 has an annular gasket 89 of shock absorbing material and an annular plate 88 secured to it by headed screws 87. These members form a continuous, inwardly projecting stop at the upper end of the cylinder for limiting upward movement of a piston 90. The piston 90 is normally maintained by air pressure against the lower face of the gasket 89 at the upper end of the cylinder 80. The piston comprises a disc 92, desirably of aluminum, and a felt packing ring 94.

A conduit 96, which lets into the cylinder 80 through the central portion of the closure plate 86, establishes and maintains free communication between the cylinder and a large air reservoir or tank 98. The tank is mounted in a supporting and reinforcing skeleton holder 100 which is secured in place near the base 10.

The tank 98 is equipped with a pressure gauge 102. An exhaust valve 104 is connected to the tank, so that the tank pressure may be reduced by permitting the escape of air when desired. An air supply conduit 108 is connected to the pneumatic system through the conduit 96, being controlled by valve 110 to increase the pressure in the tank and the cylinder when desired.

The tank holder 100, as illustrated, comprises four upright posts 112, a supporting frame 114 secured to the posts 112 and an embracing ring 116 also secured to the posts 112 but considerably above the frame 114.

As has been indicated, the purpose of the described apparatus is to raise the platform 32 with a work piece 78 to a desired height and then to let the platform with the work piece fall freely under the acceleration of gravity. When the plate 42 of the cylindrical projection 40 strikes the piston 92, the piston is driven downward against a predetermined pneumatic resistance, applying a measured deceleration (negative acceleration) to the platform and work piece until the downward motion has been arrested and the piston, now carrying the platform and work piece with it has been forced upward to its initial position in engagement with the gasket 89. It will be observed that the action of gravity has been referred to as acceleration while the effect of the pneumatically impelled piston 90 which opposes gravity has been referred to as deceleration. This convention will be adhered to throughout the present specification. For the purpose of clarity, positive acceleration will be considered as acting either to increase downward velocity or to diminish upward velocity, while negative acceleration, or deceleration, will be considered to act either to increase upward velocity or to diminish downward velocity.

With the foregoing understanding of the terms it will be seen that the platform and work are accelerated by gravity as they fall freely, are decelerated by the piston as they continue to move downward after striking the piston, and continue to be decelerated as the piston carries them upward. When the piston is arrested at its upward limit of movement the platform and work continue upward under the momentum imparted by the piston, and are again accelerated as the upward velocity is diminished and as they fall for the second time.

When a test is to be made, the work piece is first weighed so that the combined weight of the platform and the work piece may be ascertained. The air pressure in the pneumatic system is then adjusted according to such combined weight and the measure of deceleration to be imparted. The work piece is then attached firmly to the platform and the platform is raised by the winch to a desired height and detained in elevated position by the pawl 72. The tape 76 is then tugged to release the platform and permit it to fall upon the piston.

The air pressure against the piston is intended to exert a substantially constant upward force against the platform from the moment when the platform lands on the piston until the upwardly moving piston is arrested in its original position. To this end the reservoir is made large in comparison with the piston displacement, the capacity of the reservoir in the illustrative structure being thirty times the maximum piston displacement. Since the volume of the air is changed but slightly by the piston displacement, and since the air in the cylinder and the reservoir obeys Boyle's law for gases (pressure times volume equals constant) it follows that the air pressure during deceleration of the platform remains substantially constant.

The magnitude of the deceleration to which the equipment is to be subjected is governed solely by the combined mass of the work piece and the platform and the total air pressure acting on the piston, not being dependent upon the height from which the platform is dropped. The behavior is in accordance with the fundamental Newtonian law that accleration is equal to force divided by mass. For the present purpose this may be better expressed as $$A = \frac{Pg}{M} \text{ or } \frac{A}{g} = \frac{P}{M}$$

In the foregoing equation A is the acceleration (deceleration) of the piston expressed in feet per second per second, and $g$ is the acceleration of gravity, i. e. thirty two feet per second per second, so that the quotient $$\frac{A}{g}$$

is the deceleration expressed in gravities or "gs". P is the total net upward air pressure against the piston, being the product of the piston area by the pressure in pounds per square inch (above atmospheric) of the air in the pneumatic system. M is the combined mass in pounds of the platform and the work piece which is being drop tested. The height from which the platform is dropped determines the distance the piston travels and, therefore, the duration of the deceleration.

A strain gauge type of accelerometer 120 is firmly secured to the platform 32. The accelerometer employed in the illustrative machine is known as Model C-30-335 of Statham Laboratories, Inc. of Beverly Hills, California. Since its structure is well known commercially it is not shown in detail and will not be described. The accelerometer measures the acceleration, positive or negative, to which the work is subjected, and transfers the measurement electrically to the recording stylus of a recording oscillograph (not shown). The oscillograph is also of well known construction. It includes a chart web feeding mechanism and a stylus responsive to electrical energy transmitted from the accelerometer.

The record upon which the stylus acts is calibrated by the accelerometer so that the measure of acceleration in gs can be readily ascertained. A typical curve recorded by the oscillograph is produced in Figures 5, 6 and 7, these figures being segments of a continuous record which is to be read from left to right. Here the abscissas represent time while the ordinates represent acceleration.

Figure 5:
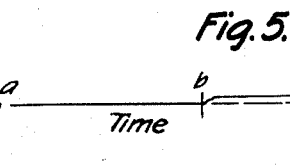
Figures 5, 6 and 7 are complementary views which when placed end to end reveal a graph of the kind recorded by the machine in a typical test.
Figure 6:
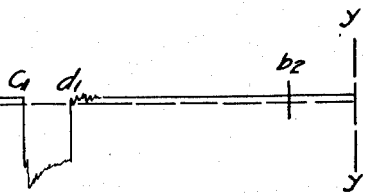
Figure 7:

In Figures 5 to 7 the curve follows the axis of abscissas from $a$ to $b$, this part representing a portion of the period before the hook 46 is tripped. At the point $b$ the hook is tripped and the platform starts to fall, being immediately subjected to the positive acceleration of gravity, equal, as shown to one g. At point $c$ (Fig. 6) the platform hits the piston and is immediately exposed to the decelerating effect of the pneumatic system as applied through the piston. This deceleration acts from $c$ to $d$. At the latter point the piston has been restored to its upper limit of movement and the platform flies upward against the opposition of gravity, being once more subjected to a positive acceleration of one G as the platform rises to $b_1$ and falls to $c_1$ of Fig. 6. The cycle from $b$ to $b_1$ is repeated from $b_1$ to $b_2$, $b_2$ to $b_3$, etc. until the platform comes to rest on the piston. The work piece is then removed from the platform and a fresh work piece is applied and tested in the manner described.

The piston is purposely made as light as possible consistent with the heavy duty which it is called upon to perform. This is for the reason that the inertia of the piston is added to the resistance of the air as the platform begins to drive the piston down, causing the decelerating force to be increased momentarily. By making the ratio of the weight of the platform and the work to the weight of the piston very large an important advantage is gained, in that the initial peak decoleration which occurs at the time of impact of the platform with the piston is minimized. The ideal would be to have the weight of the piston so small in comparison with the platform and the work, and the pneumatic resistance so unvarying that the curve of Figs. 6 and 7 would be square throughout when a rigid body is tested. Ordinarily, the platform and the work will desirably weigh a hundred times as much as the piston or more. If necessary, a make-weight body or bodies will be added to the work to produce substantially this ratio.

The effect of including spring mountings and shock absorbers in a work piece is revealed in the action of the machine and in the graphic record which it makes. The mere inclusion of a spring mounting in the work piece for an important part of its mass will cause the full deceleration to build up more gradually at first as the spring suspended part approaches the work piece base, but will cause the maximum calculated deceleration to be exceeded as the spring suspended part rebounds during the continued engagement of the platform with the piston. This may result in a choppy curve of a more or less saw-tooth character. When a true shock absorber is embodied in the work piece for checking rebound of the spring suspended part relative to the work piece base the build up to maximum acceleration is made gradual, but since there is no sharp rebounding of the spring suspended part the deceleration holds substantially steady at the maximum value. Analysis of the curve, therefore, affords valuable information as to the extent and character of protection afforded by the spring and/or shock absorber feature. This advantage is not present in the centrifugal type of testing machine.

It is not essential that the accelerometer and the recording oscillograph be operatively connected at all times. If the object is to test a series of identical parts simply to see if they can withstand specified conditions, it may be sufficient to record the first test and occasional selected tests thereafter to make sure in the first instance that there has been no error of calculation and later on that the machine is still in good operative condition. If the test conditions are varied from test to test, however, it is desirable to record each test since this affords a clear record of the fact that the intended test was correctly applied.

I have described what I believe to be the best embodiments of my invention. I do not wish, however, to be confined to the embodiments shown, but what I desire to cover by Letters Patent is set forth in the appended claims.

I claim:

1. A drop testing machine comprising, in combination, a carrier for supporting a work piece to be tested, a guide for the carrier, means for releasing the carrier when raised to permit it to fall freely, a pneumatic cylinder, a piston in the cylinder located to receive the impact of the falling carrier, arrest it, and hurl it upward, and an air reservoir in free communication with the cylinder, said reservoir being of much larger capacity than the cylinder.

2. A drop testing machine comprising, in combination, a carrier for supporting a work piece to be tested, a guide for the carrier, means for releasing the carrier when raised to permit it to fall freely, a pneumatic cylinder, a piston in the cylinder for receiving the impact of the falling carrier and work piece, means limiting upward movement of the piston to a prescribed level, and an air reservoir in free communication with the cylinder, said reservoir being of much larger capacity than the cylinder.

3. A drop testing machine comprising, in combination, a platform for supporting a work piece to be tested, a guide frame for the platform, means for releasing the platform when raised to permit it to fall freely, a pneumatic system including a cylinder and a communicating reservoir, the cylinder being located directly beneath the platform and the reservoir having many times the capacity of the cylinder, a pneumatically sustained piston engageable by a portion of the platform as the platform falls and movable in the cylinder, and means for adjusting the air pressure in the pneumatic system to various selected values.

4. A drop testing machine as set forth in claim 3 in which the platform includes a depending extension which has a lower end portion for engaging the piston and travelling freely in the cylinder with the piston, which end portion coincides substantially with the shape and area of the exposed portion of the upper face of the piston.

5. A drop testing machine as set forth in claim 3 in which the platform includes a depending extension having a lower end portion for engaging the piston and traveling freely in the cylinder with the piston, which end portion coincides substantially in shape and area with the exposed portion of the upper face of the piston, the cylinder being provided at its upper end with a continuous, inwardly projecting stop flange for arresting upward movement of the piston at a predetermined level.

6. A drop testing machine comprising, in combination, a platform for supporting a work piece to be tested, a guide frame for the platform, means for releasing the platform when raised to permit it to fall freely, a pneumatic system including a cylinder and a communicating reservoir, the cylinder being located directly beneath the platform and the reservoir having many times the capacity of the cylinder, a pneumatically sustained piston engageable by a portion of the platform as the platform falls and movable in the cylinder, and means for adjusting the air pressure in the pneumatic system to various selected values, the platform including a depending extension having a lower end portion for engaging the piston, which end portion coincides substantially in shape and area with the exposed portion of the upper face of the piston, the cylinder being provided at its upper end with a continuous, inwardly projecting stop flange for arresting upward movement of the piston at a predetermined level, and the piston being of small mass as compared to the combined mass of the platform and its load and including a thin disc-like body with which the platform extension and the stop flange of the cylinder engage.

7. A drop testing machine comprising, in combination, a carrier for supporting a work piece to be tested, a guide for the carrier, means for releasing the carrier when raised to permit it to drop freely, pneumatic mechanism including a pneumatic cylinder, a floating piston located in the cylinder to receive the impact of the falling carrier, arrest it, and hurl it upward, and an air reservoir in free communication with the cylinder, said reservoir being of much larger capacity than the cylinder, the piston being of small mass and the carrier, with its load, including make-weight load if necessary, having a mass many times that of the piston, to limit abnormality of deceleration caused by the inertia of the piston at the moment of initial impact.

8. A drop testing machine comprising, in combination, a carrier for supporting a work piece to be tested, a guide for the carrier, means for releasing the carrier when raised to permit it to fall freely, and pneumatic mechanism including a cylinder, a reservoir constantly communicating with the cylinder, and a floating piston in the cylinder, located to receive the impact of the falling carrier, arrest it and hurl it upward, said reservior having a capacity so large in comparison with the available piston displacement as to assure the maintenance of a substantially uniform upward force against the piston throughout the deceleration of the carrier and its load.

9. A drop testing machine comprising, in combination, a carrier for supporting a work piece to be tested, a drive for lifting the carrier, means for releasing the carrier when raised to permit it to fall freely, and pneumatic decelerating mechanism located to receive the impact of the falling carrier, including a cylinder, a reservoir constantly communicating with the cylinder, and a floating piston in the cylinder, said mechanism resisting the falling carrier and its load through compression and said reservoir having a capacity at least thirty times as great as the capacity of the cylinder so that the resistance to compression and tendency toward recovery of said mechanism are maintained substantially constant throughout the deceleration of the carrier and its load, the pneumatic pressure of the decelerating mechanism being adjustable throughout a range so broad that the maximum available resisting force is several times that of the minimum resisting force, and means for effecting adjustment according to the known mass of the carrier and its load to produce a predetermined measure of deceleration.

ERWIN W. TSCHUDI.

References Cited in the file of this patent

UNITED STATES PATENTS

| Number | Name | Date |
| --- | --- | --- |
| 1,561,154 | Gilman | Nov. 10, 1925 |
| 1,583,109 | Banschbach | May 4, 1926 |
| 1,809,347 | Martin | June 9, 1931 |
| 2,115,841 | Case | May 3, 1938 |
| 2,237,326 | Barry | Apr. 8, 1941 |
| 2,496,420 | Stern | Feb. 7, 1950 |

FOREIGN PATENTS

| Number | Country | Date |
| --- | --- | --- |
| 871,974 | France | Jan. 29, 1942 |